W. WENDERHOLD.
AUTOMATIC FILM BREAK DETECTOR FOR MOTION PICTURE MACHINES.
APPLICATION FILED OCT. 14, 1915.

1,358,806.

Patented Nov. 16, 1920.
3 SHEETS—SHEET 1.

WITNESSES:

INVENTOR
William Wenderhold
BY
ATTORNEY

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

AUTOMATIC FILM-BREAK DETECTOR FOR MOTION-PICTURE MACHINES.

1,358,806.           Specification of Letters Patent.    Patented Nov. 16, 1920.

Application filed October 14, 1915. Serial No. 55,794.

*To all whom it may concern:*

Be it known that I, WILLIAM WENDERHOLD, a citizen of the United States, residing at New York city, in the county and State of New York, have invented certain new and useful Improvements in Automatic Film-Break Detectors for Motion-Picture Machines, of which the following is a clear, full, and exact description.

The object of my invention is to provide a device to arrest the driving mechanism in a motion picture machine automatically if the picture film therein has become broken or defective.

To accomplish the object of my invention, I provide a clutch mechanism between a driving shaft and the film-advancing device and control the clutch mechanism by the body of the film itself, or by the tension applied to the film. I preferably interpose the control member of my device above the aperture in a motion picture machine and as near the upper reel as is permissible so that the control device will stop the motion picture machine operation in order that the film may be quickly repaired as both of the defective ends of the film are in close proximity to each other above the aperture.

In my drawings I illustrate two different types of my invention, but the objects thereof are the same. In the drawings the device is entirely controlled by the tension of the film. In the type shown in Fig. 1, the mere present of the film controls the device.

Referring to the drawings, which form a part of this specification,

Figure 1:
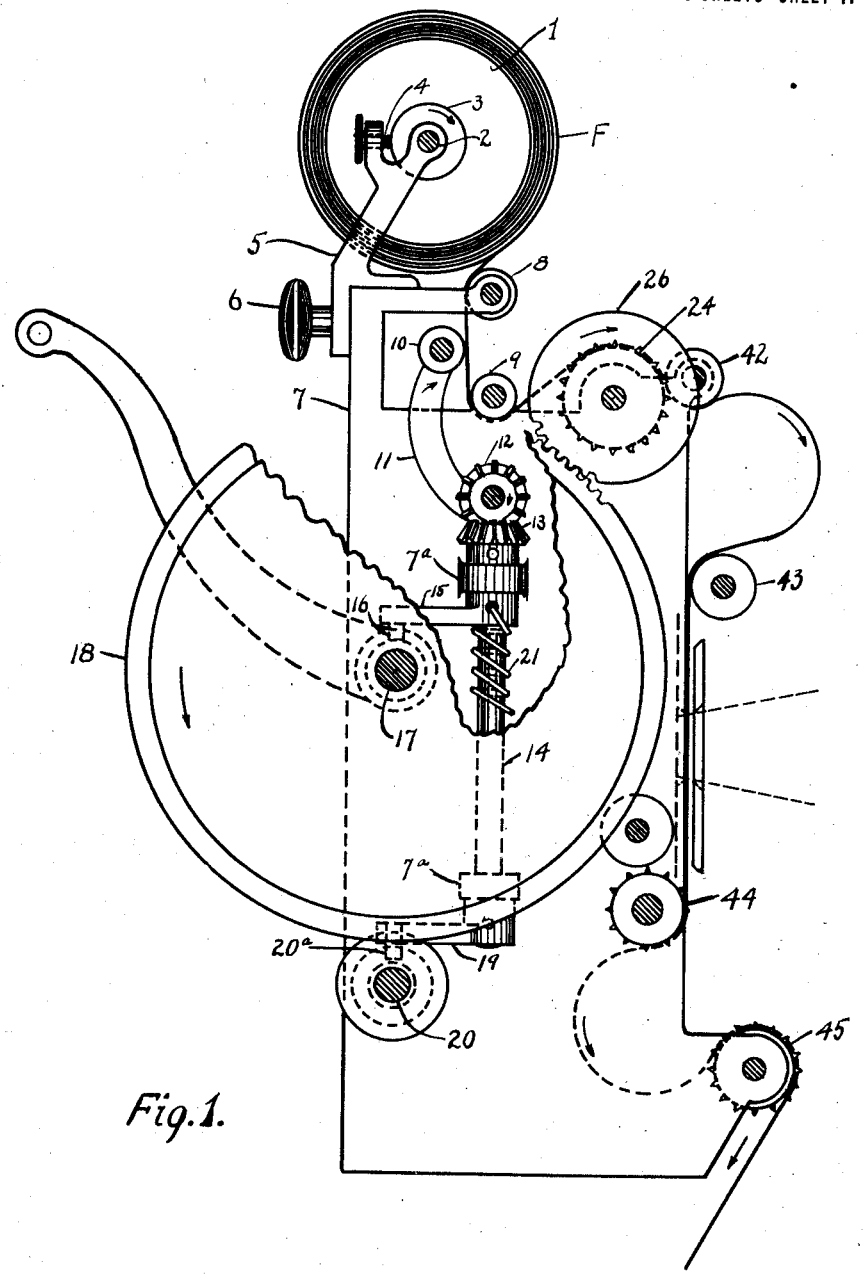
Figure 1 is a side elevation of a motion picture machine embodying one type of my invention.

As shown in Fig. 1, the film F is received from the usual film reel 1, which is mounted on shaft 2, said shaft having a friction disk 3 and said friction disk receiving friction by means of a screw 4. Members 1, 2, 3 and 4 are mounted on the frame support 5 and attached by screws 6 to the motion picture machine 7. The film F passes by the rollers 8 and 9, which are mounted fixedly. The roller 10 is supported by an arm pivotally connected, said arm having a bevel gear 12. The bevel gear 13 is fastened on shaft 14, and is mounted in the frame 7 at the points 7ª and a lever 15 with an engaging clutch pin 16 is mounted on the shaft 14. The clutch pin 16 engages the clutch controlling the connections between the crank shaft 17 and the main driving gear 18. On the lower end of shaft 14 is mounted another clutch lever 19 which carries the pin 20ª, the member controlling the connections between a motor driven shaft 20 and the general motion picture machine.

Figure 2:
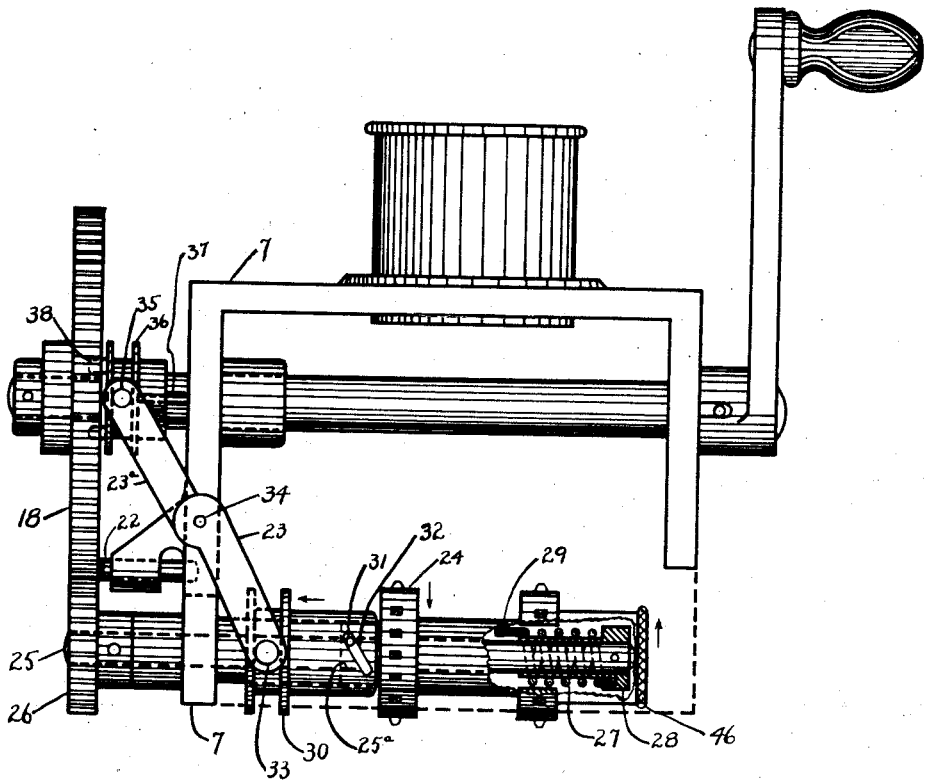
Fig. 2 is a top view of a motion picture machine embodying another type of my invention.

Should the film break at any time or the supply of film from reel 1 fail for any reason whatsoever, then the roller 10 on lever 11 will be forced in between the rollers 8 and 9 by the pressure of the spring 21 and by the movement of arm 11 the clutch of the crank shaft 17 and the motor shaft 20 will be disengaged and the entire motion picture machine film feeding mechanism will come to a stop, especially if a brake means is also connected with the clutch operating levers, as shown in Fig. 2. The brake plug 22 is pressed against the gear 18, which is mounted loosely on a shaft 17, and when the lever 23 is operated, the action of the device, in so far as described, is controlled merely by the presence of film between the rollers 8, 9 and 10. No particular care need be taken regarding the tension on reel 1. In fact, no tension is needed since the space between the rollers 8 and 9 is just sufficient to allow the roller 19 to pass between them.

Figure 3:
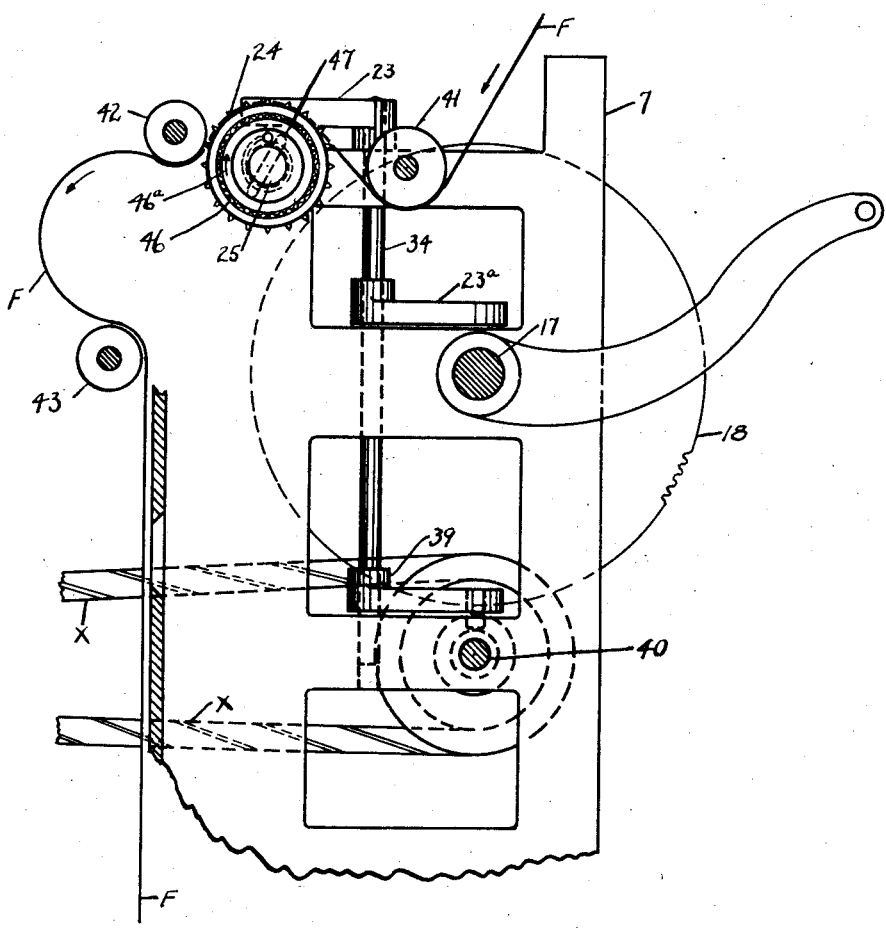
Fig. 3 is a side elevation of a motion picture machine as referred to in Fig. 2.

In Figs. 2 and 3, the object of the device is the same, but the form it takes is different and it is entirely controlled by the backward pull of the film F which is caused by the friction members 2, 3, 4 and 5 in Fig. 1. The upper film feed sprocket 24 is flexibly mounted on the shaft 25, which carries gear 26, driven by gear 18. On one end of shaft 25 a spring 27 is fastened to a collar 28. At the other end of the spring the film-feed sprocket 24 is connected at point 29. I therefore have a flexible driving connection between the driving shaft 25 and the film feed sprocket 24. This sprocket is provided with a projection 25ª extending into a rotatable collar 30 and mounted in said projection is a pin 31, which connects the film sprocket 24 with the rotatable collar 30 by means of a spiral groove 32. If for any reason whatever the film supply to the sprocket 24 should cease, then the spiral spring 27 will force the sprocket farther ahead than the natural rotation of shaft 25, and by means of the pin 31 in groove 32, the collar 30 is forced away from the sprocket 24, thus the lever 23 by means of pin 33 is moved on its pivotal axis 34, and through pin 35 in lever 23ª separates the clutch members 36 and 18. The clutch 36 is mounted on the crank shaft 17 said clutch being operatively connected with said crank shaft by key and slot 37. The pin engaging the gear on the lower end of shaft 34 is mounted on another lever 39, see Fig. 3, and similar clutch means on the motor driven shaft 40 as heretofore described on shaft 19. (See members 35, 36, 37 and 38.) The flexible rotary movement of sprocket 24 is of course predeterminately limited either by slot 32 or by a pin 47, as indicated by the dotted lines in Fig. 3. The belt X is supposed to connect with a source of rotary power and same should apply to shaft 20 in Fig. 1. The rollers 41, 42 and 43 are the usual idler rollers used in motion picture machines, such as the "power projector." The sprocket 24 is the usual continuously rotating feed sprocket and 44 is the usual intermittently moved sprocket, and 45 is the usual lower take-up sprocket. On the sprocket 24 I provide a knurled knob 46 which is a part of said sprocket. The purpose of this knob is to give the operator means to set the mechanism in motion, as tension in the film F may not be present at the time it is desired to start the operation of the motion picture machine. Therefore, if the operator will turn the knob backward as indicated by arrow 46ª in Fig. 3, the clutch members will be engaged independent of the action of the film while the operator is retarding the knob 46.

The device can be changed considerably without departing from the principles involved, and it may be stated that as shown in Fig. 1, the mechanism can be started by simply returning the roller 10 to the position illustrated in Fig. 1.

The scope of my invention will be pointed out in the following claims.

I claim as my invention:

1. In a motion picture machine, the combination with a driving shaft for operating the same, of a film advancing device, a clutch for establishing mechanical connection between said shaft and device, and means controlled by the tension of the film passing through the machine for maintaining said clutch in engagement with said shaft to transmit rotary motion therefrom to said device.

2. In a motion picture machine, the combination with a driving shaft for operating the same, of a film advancing device, a clutch for establishing mechanical connection between said shaft and device, said clutch being in engaged position when the tension of the film is of a predetermined degree, and means for disengaging said clutch when the tension on the film becomes less than the predetermined degree.

3. In a motion picture machine, a driving shaft for operating the same, a film feed sproket, connections between said shaft and sprocket, a roll of film, a pivotally mounted roller positioned to bear against the film to be influenced by variations in the tension thereof, and means controlled by the pivotal movement of said roller for controlling the connections between said shaft and sprocket.

4. In a motion picture machine, a driving shaft, a film feed sprocket, connections between said shaft and said sprocket, a clutch for controlling said connections, and means controlled by the tension of the film passing through the machine for controlling said clutch.

5. In a motion picture machine, a driving shaft, a film feed sprocket, connections between said shaft and said sprocket, a clutch for controlling said connections, a roll of film mounted in said machine, and means controlled by the tension of the film between the roll and said sprocket, for controlling said clutch.

6. In a motion picture machine, a shaft for operating the same, a film feed sprocket, connections between said shaft and said sprocket, a clutch for controlling said connections, means controlled by the tension of a film passing through said machine for normally maintaining said clutch in engaging position to establish power connection between said shaft and said sprocket, and means rendered operative by the absence of film in said machine, for disengaging said clutch.

Signed at New York city, New York, this 13th day of October, one thousand nine hundred and fifteen.

WILLIAM WENDERHOLD.

In presence of—
ROBERT RICHTER,
FRED F. WEISS.